United States Patent
Kurimura

(10) Patent No.: US 8,864,380 B2
(45) Date of Patent: Oct. 21, 2014

(54) FLUID DYNAMIC BEARING DEVICE

(75) Inventor: Tetsuya Kurimura, Kuwana (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/575,495

(22) PCT Filed: Feb. 24, 2011

(86) PCT No.: PCT/JP2011/054124
§ 371 (c)(1),
(2), (4) Date: Jul. 26, 2012

(87) PCT Pub. No.: WO2011/105481
PCT Pub. Date: Sep. 1, 2011

(65) Prior Publication Data
US 2012/0294556 A1    Nov. 22, 2012

(30) Foreign Application Priority Data

Feb. 26, 2010 (JP) .................... 2010-042194
Feb. 23, 2011 (JP) .................... 2011-036958

(51) Int. Cl.
*F16C 32/06* (2006.01)
*F16C 17/08* (2006.01)
*F16C 35/02* (2006.01)
*F16C 33/74* (2006.01)
*H02K 5/167* (2006.01)
*F16C 17/10* (2006.01)

(52) U.S. Cl.
CPC ............... *F16C 17/08* (2013.01); *F16C 35/02* (2013.01); *F16C 33/74* (2013.01); *H02K 5/1675* (2013.01); *F16C 2370/12* (2013.01); *F16C 17/107* (2013.01)
USPC ........................................... 384/107

(58) Field of Classification Search
USPC ................. 384/100, 107, 101–106, 108–124; 310/90; 360/99.08, 99.07
See application file for complete search history.

(56) References Cited

U.S. PATENT DOCUMENTS 5,810,480 A    9/1998   Asada et al.
6,242,830 B1   6/2001   Katagiri (Continued)

FOREIGN PATENT DOCUMENTS

| CN | 1169512 A | 1/1998 |
|---|---|---|
| CN | 1331509 A | 1/2002 |

(Continued)

OTHER PUBLICATIONS

Notification of Transmittal of Translation of the International Preliminary Report on Patentabililty Form PCT/IB/338 (1 page) of International Application No. PCT/JP2011/054124 mailed Sep. 13, 2012 with Forms PCT/IB/373 (1 page) and PCT/ISA/237 (7 pages).

(Continued)

*Primary Examiner* — Alan B Waits
(74) *Attorney, Agent, or Firm* — Westerman, Hattori, Daniels & Adrian, LLP

(57) ABSTRACT

A fluid dynamic bearing device 1 has a bearing sleeve 8, a shaft member 2 which is inserted in the inner periphery of the bearing sleeve, a housing 7 which is formed by pressing, has the bearing sleeve 8 press-fitted in the inner periphery thereof, and has a stepped section 7*d* which engages with the end surface of the bearing sleeve and is located ahead in the direction of press-fitting of the bearing sleeve 8, a thrust receiver 9 which is in contact with and supports an end of the shaft member 2, and a seal portion 10 which prevents oil from leaking from the inside of the housing. A dynamic pressure generating groove 8*a*1 for generating fluid dynamic pressure in a radial bearing gap between the outer peripheral surface of the shaft member 2 and the inner peripheral surface of the bearing sleeve 8 is formed in the inner peripheral surface of the bearing sleeve 8.

12 Claims, 9 Drawing Sheets

(56) References Cited

U.S. PATENT DOCUMENTS

| | | | |
|---|---|---|---|
| 6,965,180 B2* | 11/2005 | Oh et al. ................... | 310/90 |
| 7,008,112 B2* | 3/2006 | Yamashita et al. ............ | 384/119 |
| 7,625,124 B2* | 12/2009 | Satoji et al. ................. | 384/107 |
| 2002/0097931 A1 | 7/2002 | Saito et al. | |
| 2003/0002757 A1 | 1/2003 | Hajota et al. | |
| 2004/0013329 A1 | 1/2004 | Yamashita et al. | |
| 2005/0254736 A1* | 11/2005 | Shishido et al. ............. | 384/107 |
| 2008/0204929 A1 | 8/2008 | Masazuki et al. | |
| 2009/0080817 A1 | 3/2009 | Gomyo | |
| 2009/0103207 A1* | 4/2009 | Miyauchi et al. ......... | 360/99.08 |
| 2009/0161253 A1* | 6/2009 | Shirai et al. ............... | 360/99.08 |
| 2009/0297078 A1* | 12/2009 | Hori et al. .................. | 384/107 |

FOREIGN PATENT DOCUMENTS

| | | |
|---|---|---|
| FR | 1 486 846 A | 6/1967 |
| JP | 63-78722 U | 5/1988 |
| JP | 2001-12369 A | 1/2001 |
| JP | 2003-083323 A | 3/2003 |
| JP | 2004-245248 A | 9/2004 |
| JP | 2005-127524 A | 5/2005 |
| JP | 2008-202642 A | 9/2008 |
| JP | 2009-108869 A | 5/2009 |
| JP | 2009-150505 A | 7/2009 |

OTHER PUBLICATIONS

International Search Report for PCT/JP2011/054124, mailing date of May 17, 2011.
Office Action dated Apr. 30, 2014, issued in Chinese Patent Application No. 201180010531.3 with Partial English Translation (14 pages).
Extended European Search Report dated Nov. 6, 2013, issued in European Patent Application No. 11747441.1, (7 pages).
Japanese Office Action dated Aug. 22, 2014, issued in corresponding Japanese Patent Application No. 2011-036958 (4 pages).

* cited by examiner

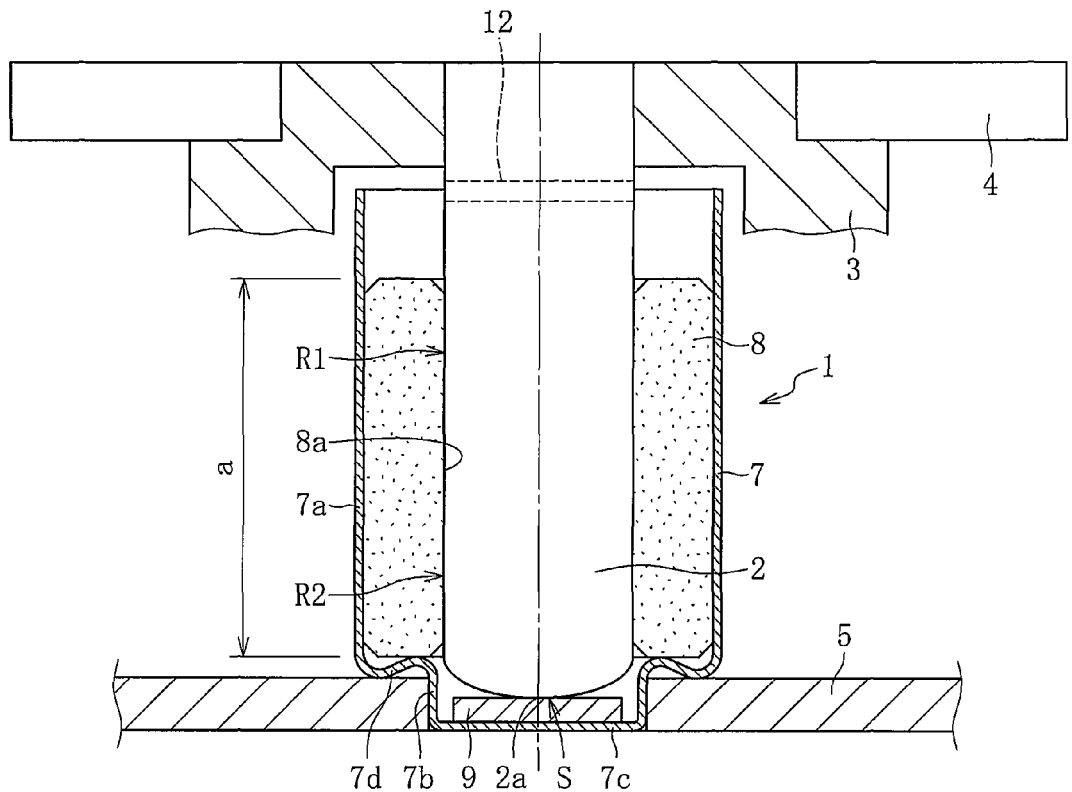
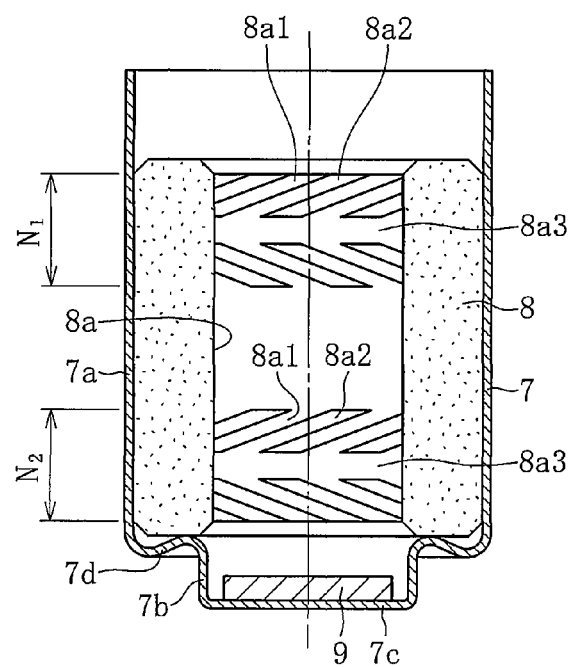

FLUID DYNAMIC BEARING DEVICE

TECHNICAL FIELD

The present invention relates to a fluid dynamic bearing device which rotatably supports a shaft member by fluid dynamic pressure formed in a bearing gap.

BACKGROUND ART

A fluid dynamic bearing device has features of high-speed rotation, high rotation accuracy, and low noise. In recent years, by making full use of the features, the fluid dynamic bearing device has been preferably used as a bearing device for motors which is mounted in various electric equipment including information equipment, more specifically, as a bearing device for motors, such as a spindle motor of a magnetic disk device such as an HDD, an optical disk device such as a CD-ROM, CD-R/RW, DVD-ROM/RAM, and a magneto-optical disk device such as an MD and MO, a polygon scanner motor of a laser beam printer (LBP), a color wheel motor of a projector, and a fan motor.

As shown in FIG. 13, such a fluid dynamic bearing device has a bearing sleeve 108 made of sintered metal, a shaft member 102 which is inserted in the inner periphery of the bearing sleeve 108 and is relatively rotated with respect to the bearing sleeve 108, and a housing 107 which houses the bearing sleeve 108. The shaft member 102 has a flanged section 102b at an end of a shaft section 102a. A radial bearing gap is formed between an outer peripheral surface of the shaft section 102a and an inner peripheral surface of the bearing sleeve 108. A first thrust bearing gap S1 is formed between one end surface 102b1 of the flanged section 102b and an end surface 108a of the bearing sleeve 108 opposite thereto. A second thrust bearing gap S2 is formed between the other end surface 102b2 of the flanged section 102b and an inner bottom surface of a housing bottom section 107c. At the time of rotation of the shaft member 102, a dynamic pressure action is produced by a lubricating oil filled in the radial bearing gap, the first thrust bearing gap S1, and the second thrust bearing gap S2, thereby rotatably supporting the shaft member 102 in the radial direction and in both the thrust directions. An upper end opening of the housing 107 is sealed by a seal member 110 (Patent Document 1).

PRIOR ART DOCUMENTS

Patent Documents

Patent Document 1: Japanese Patent Laid-open Publication No. 2003-83323

SUMMARY OF THE INVENTION

Problems to be Solved by the Invention

The fluid dynamic bearing device shown in FIG. 13 has the following problems.

Since an accuracy of about several μm is required in the two thrust bearing gaps, it is necessary to finely adjust the position in the axial direction of the bearing sleeve and a bottom member with respect to the housing for each unit in gap setting of the thrust bearing gaps. Therefore, the assembling process is complicated.

In many cases, the housing is metal machined or resin molded. The machined housing has high rigidity, so that at the time of press-fitting the bearing sleeve in the inner periphery of the housing, variations of the press-fit allowance in the peripheral direction affect the accuracy of the inner peripheral surface of the bearing sleeve. To avoid this, the inner peripheral surface of the housing and the outer peripheral surface of the bearing sleeve are required to have higher accuracy, with the result that the processing cost of these members is increased. In addition, to prevent galling, it is necessary to accurately align the housing and the bearing sleeve at the time of press-fitting.

On the other hand, the resin molded housing is required to adhesively fix the bearing sleeve in order to ensure the removing force of the bearing sleeve. The adhesive fixing requires a baking process or is required to hold the position relation between the bearing sleeve and the housing by a jig until an adhesive is solidified, with the result that the adhesive process is complicated to increase the cost. In addition, when the bearing sleeve is fixed by press-fitting without being adhesively fixed, the press-fit allowance is required to be largely taken, resulting in causing the same problem as the metal machined housing.

Since the flanged section is formed at one end of the shaft member, the bearing device cannot be assembled (the shaft member cannot be inserted in the inner periphery of the bearing sleeve) in the state that a different flanged member (e.g., hub) is attached to the other end of the shaft member. Therefore, the flanged member is required to be detached at the time of assembling, thereby limiting the assembling procedure.

From the reasons listed above, the configuration and the assembling process of the conventional fluid dynamic bearing device are likely to be complicated. The cost of each component has been attempted to be reduced, but this alone cannot realize great cost reduction. Therefore, it is desired that the configuration and the assembling process of the bearing device be radically reviewed and be simplified. An object of the present invention is to significantly simplify the configuration and the assembling process of the fluid dynamic bearing device to achieve cost reduction by radically modifying the conventional design concept.

Solutions to the Problems

A fluid dynamic bearing device according to the present invention has a bearing sleeve, a shaft member which is inserted in the inner periphery of the bearing sleeve, a dynamic pressure generating section which is formed in any one of the outer peripheral surface of the shaft member and the inner peripheral surface of the bearing sleeve and generates fluid dynamic pressure in a radial bearing gap between an outer peripheral surface of the shaft member and an inner peripheral surface of the bearing sleeve, a housing which is formed by pressing, has the bearing sleeve press-fitted in the inner periphery thereof, and has an engaged section which engages with an end surface of the bearing sleeve and is located ahead in the direction of press-fitting of the bearing sleeve, and a thrust receiver which is in contact with and supports an end of the shaft member.

According to the above configuration, the relative position in the axial direction of the housing and the bearing sleeve can be determined simply by press-fitting the bearing sleeve in the housing and by further pressing the bearing sleeve until the end surface of the bearing sleeve engages with the engaged section of the housing. Thereafter, the basic configuration of the bearing device is completed simply by inserting the shaft member in the inner periphery of the bearing sleeve. At this time, the thrust bearing includes a so-called pivot bearing, so that the gap setting operation of the thrust bearing gap is unnecessary, thereby reducing the allowable dimension error in the relative position in the axial direction of the bearing sleeve and the housing. Further, the pressed housing has low rigidity to reduce the pressing force in the inner diameter direction after press-fitting. Therefore, the press-fitting operation can be smoothly performed even when the housing and the bearing sleeve are slightly misaligned. From the above, the assembling operability can be remarkably increased and the configuration can be simplified.

In addition, the processing cost of the housing formed by pressing is significantly lower than that of the machined housing, so that the component cost can also be reduced.

In this way, the configuration and the assembling process of the bearing device can be significantly simplified, and the component cost can be reduced, so that the cost of the entire bearing device can be reduced.

The pressed housing has low rigidity, as described above, thereby having a smaller pressing force in the inner diameter direction that the press-fitted bearing sleeve receives from the housing than the machined housing. Therefore, the deformation of the inner peripheral surface of the bearing sleeve with press-fitting can be prevented to avoid the accuracy lowering due to the deformation of the radial dynamic pressure generating region which faces the radial bearing gap. In addition, it is unnecessary to attach the flanged section to one end of the shaft member. Therefore, the bearing device can be assembled even when the different flanged member such as a rotor is attached to the other end of the shaft member.

In the fluid dynamic bearing device, a large diameter section, a small diameter section, and a stepped section which connects the large diameter section and the small diameter section are provided in the housing, the stepped section being capable of configuring the engaged section.

In addition, in the fluid dynamic bearing device, a bottom section is integral with or is separated from the housing, and the separated thrust receiver can be arranged on the bottom section. In this case, a whirl stop for the thrust receiver is preferably provided on the bottom section of the housing.

Alternatively, the bottom section is integral with or is separated from the housing, and the thrust receiver can be integral with the bottom section. In this case, the contacted portion of the bottom section of the housing with the shaft member is preferably subjected to a surface treatment.

In addition, in the fluid dynamic bearing device, the press-fitted portions between the outer periphery of the bearing sleeve and the inner periphery of the housing can be provided at intervals in the peripheral direction. Specifically, the portions of the inner peripheral surface of the housing which are at least opposite the outer peripheral surface of the bearing sleeve are formed to have a polygonal cross section, or a plurality of projections are provided in the peripheral direction in the portions of the inner peripheral surface of the housing which are at least opposite the outer peripheral surface of the bearing sleeve. In the former configuration, the portions of the housing which are at least opposite the outer peripheral surface of the bearing sleeve may be formed to have a uniform wall thickness. The outer peripheral surface of the housing may be formed to have a circular cross section.

In the fluid dynamic bearing device, the pressed housing is desirably annealed.

Effects of the Invention

As described above, the present invention provides a new design concept which is different from the conventional design concept, and simplifies the configuration and the assembling process of the bearing device. Specifically, the following operation effects can be obtained:

The relative position in the axial direction of the housing and the bearing sleeve can be determined simply by press-fitting the bearing sleeve in the inner periphery of the housing and by further pressing the bearing sleeve until the end surface of the bearing sleeve engages with the engaged section of the housing.

The gap setting operation of the thrust bearing gap is unnecessary, and the basic configuration of the bearing device is completed simply by inserting the shaft member in the inner periphery of the press-fitted bearing sleeve.

The press-fitting operation can be smoothly performed even when the housing and the bearing sleeve are slightly misaligned, so that the alignment of the housing and the bearing sleeve at the time of press-fitting can be rough.

Therefore, the configuration and the assembling process of the bearing device can be significantly simplified.

BRIEF DESCRIPTION OF THE DRAWINGS

FIG. 1 is a cross-sectional view showing the main portion of a polygon scanner motor into which a fluid dynamic bearing device is incorporated.

FIG. 2 is a cross-sectional view showing the fluid dynamic bearing device before a shaft member is inserted.

FIG. 4b is a diagram showing an embodiment in which the whirl stop is provided on the thrust receiver and is a cross-sectional view taken along line A-A in FIG. 4a.

FIG. 5b is a diagram showing an embodiment in which the whirl stop is provided on the thrust receiver and is a cross-sectional view taken along line A-A in FIG. 5a.

EMBODIMENTS OF THE INVENTION

Figure 3:
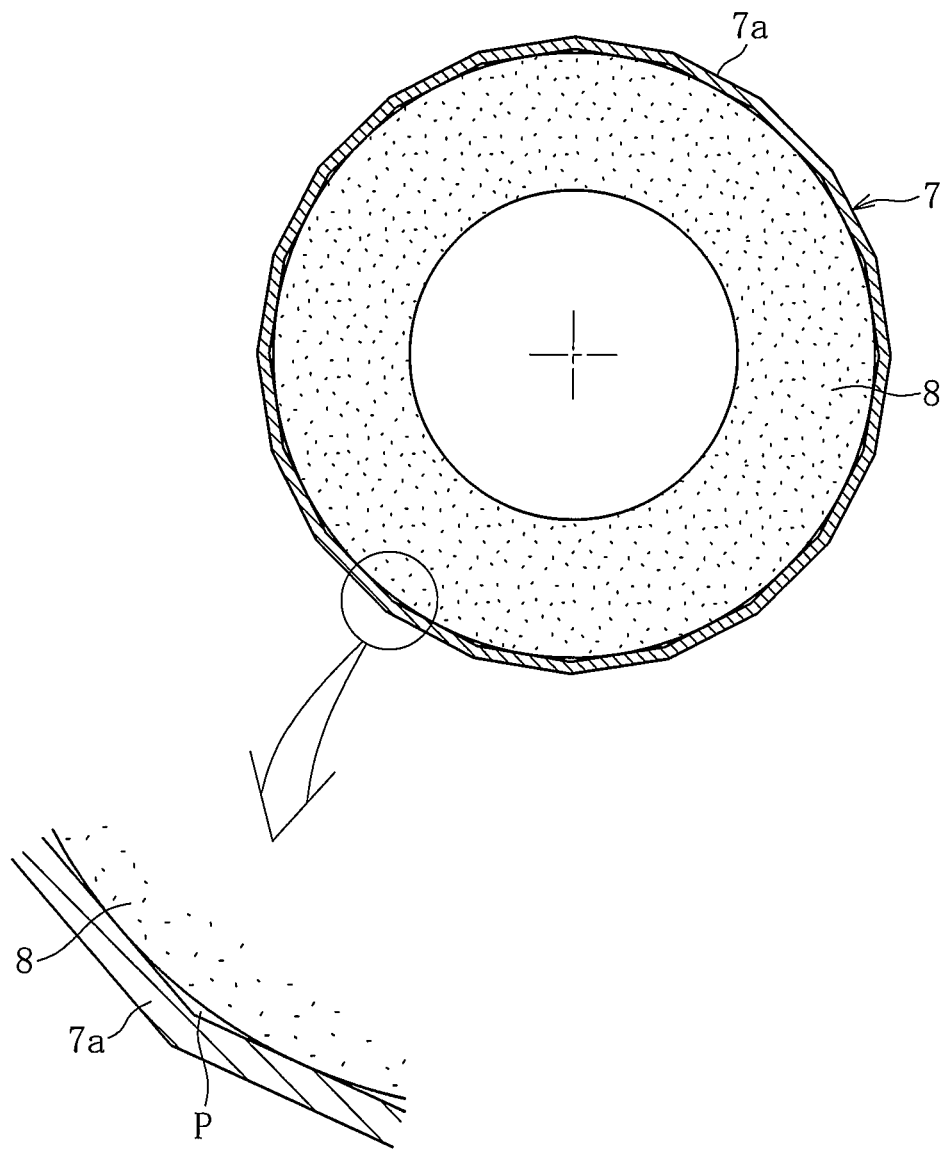
FIG. 3 is a transverse sectional view of the fluid dynamic bearing device shown in FIG. 2 and a partially enlarged view thereof.

Hereinafter, an embodiment of the present invention will be described with reference to the drawings.

FIG. 1 shows the main portion of a polygon mirror spindle motor provided in a laser beam printer (LBP) as an example of a spindle motor for information equipment. The motor has a fluid dynamic bearing device 1, a rotor 3 which is fixed to the upper end of a shaft member 2 of the fluid dynamic bearing device 1, a polygon mirror 4 which is attached to the rotor 3, and a circuit board 5 as a base. A rotor magnet (not shown) which is attached to the rotor 3 is rotated by an electromagnetic force between the rotor magnet and a stator coil (not shown) which is attached to the circuit board 5, so that the rotor 3 and the polygon mirror 4 are rotated integrally with the shaft member 2. The magnetic bias in the axial direction is exerted between the rotor magnet and the stator coil, so that the pressing force in the axial direction is downwardly exerted to the shaft member 2.

The fluid dynamic bearing device 1 has a housing 7, a bearing sleeve 8 which is fixed to the inner periphery of the housing 7, the shaft member 2 which is inserted in the inner periphery of the bearing sleeve 8, and a thrust receiver 9 which is arranged in the housing.

The housing 7 is formed by pressing, e.g., deep drawing a steel plate (e.g., a stainless steel plate of SUS305). The illustrated housing 7 is formed in a substantially cylindrical shape with a bottom, integrally has a large diameter section 7a on the upper side thereof and a small diameter section 7b on the lower side thereof, and has in its entirety a substantially uniform wall thickness. In the illustrated example, the small diameter section 7b integrally has a bottom section 7c which closes an end of the housing, and a stepped section 7d which connects the large diameter section 7a and the small diameter section 7b has an S-shaped cross section. As described later, an stepped section 7d functions as an engaged section which engages with the end surface of the bearing sleeve 8 located in the direction of press-fitting of the bearing sleeve 8 (the lower end surface thereof). As shown in FIG. 3, the large diameter section 7a of the housing 7 is formed to have a polygonal cross section (in the drawing, a regular icosagonal shape) and has both the inner peripheral surface and the outer peripheral surface thereof which have angular portions at equally spaced intervals in the peripheral direction (polygonal portions). The small diameter section 7b is formed in a tubular shape, and has both the inner and outer peripheral surfaces thereof which have a circular cross section. The polygonal portions of the large diameter section 7a should be at least formed in a region a opposite the outer peripheral surface of the bearing sleeve 8. The large diameter section 7a except for the region a may be formed in a tubular shape and have the inner and outer peripheral surfaces thereof which have a circular cross section. The opening end of the housing 7 (the opening end of the large diameter section 7a) is located in the position projected to an opening side of the housing from the end surface of the bearing sleeve 8 on the opening side of the housing. Any material of the housing 7 can be selected as long as pressing can be accurately performed, and a metal plate of other than stainless steel, e.g., brass, can also be used.

The circuit board 5 is fixed onto the outer peripheral surface of the small diameter section 7b by adhesive means. At this time, the stepped section 7d may have a flat surface so that the surface of the circuit board 5 is brought into surface-to-surface contact therewith and is fixed thereonto (not shown). However, as shown in FIG. 1, the circuit board 5 annularly makes a line contact with the stepped section 7d at a curved point on the outer diameter side of the stepped section 7d having an S-shaped cross section. Therefore, the influence of rattling between both the surfaces can be avoided to easily obtain a good squareness tolerance between the housing 7 and the circuit board 5.

The bearing sleeve 8 is a porous body of sintered metal which mainly includes, e.g., copper or iron, and is formed in a tubular shape through the processes of pressed particle molding, sintering, and sizing. A lubricating oil is impregnated into the sized bearing sleeve 8 to fill the lubricating oil into inner hollow holes thereof. The bearing sleeve can also be formed, not only of sintered metal, but also of a soft metal material such as brass and other porous body which is not made of sintered metal (e.g., porous resin).

As shown in FIG. 2, two radial dynamic pressure generating regions N1 and N2 in which a plurality of dynamic pressure generating grooves 8a1 as a dynamic pressure generating section are arrayed in a herringbone shape are formed in an inner peripheral surface 8a of the bearing sleeve 8a so as to be separated to the upper and lower sides. Each of the radial dynamic pressure generating regions N1 and N2 is formed with back portions 8a2 which define the dynamic pressure generating grooves 8a1 in the peripheral direction and an annular smooth section 8a3, in addition to the dynamic pressure generating grooves 8a1. The dynamic pressure generating grooves 8a1 and the back portions 8a2 are formed on both sides in the axial direction so as to be symmetric with respect to the smooth section 8a3. The back portions 8a2 and the smooth section 8a3 have a convex shape at the same level, and the region of the inner peripheral surface 8a of the bearing sleeve 8 (including the dynamic pressure generating grooves 8a1) other than the back portions 8a2 and the smooth section 8a3 is formed in a concave shape at the same level. In the illustrated example, the upper and lower radial dynamic pressure generating regions N1 and N2 have an equal length. In the sizing process of the bearing sleeve 8 made of sintered metal, the radial dynamic pressure generating regions N1 and N2 are molded in such a manner that a core rod which has an outer peripheral surface formed with forming portions corresponding to the shape of the radial dynamic pressure generating regions N1 and N2 is inserted in the inner periphery of the bearing sleeve 8, the bearing sleeve 8 is press-fitted in a die in the state that both end surfaces thereof are constrained by a punch, the inner peripheral surface of the bearing sleeve 8 is pressed onto the outer peripheral surface of the core rod, and the shape of the forming portions are transferred onto the inner peripheral surface of the bearing sleeve 8.

The shaft member 2 is formed in a shaft shape to have a spherical section 2a at the end thereof, and is formed of, e.g., stainless steel. The spherical section 2a of the shaft member 2 is brought into contact with the thrust receiver 9 which is arranged on an inner bottom surface of the bottom portion 7c of the housing, thereby configuring a thrust bearing section S which functions as a pivot bearing. The thrust receiver 9 is formed of a material which has low friction and is excellent in wear resistance, e.g., resin, and is arranged on the inner bottom surface of the bottom section 7c of the housing. The thrust receiver 9 may be omitted by forming a film which has low friction and is excellent in wear resistance (e.g., a resin film and a hard film) in a slid portion of the surface of the bottom portion 7c of the housing on the shaft member 2. In this case, the bottom portion 7c functions as the thrust receiver 9.

For assembling the fluid dynamic bearing device 1, first, the thrust receiver 9 is arranged on the bottom section 7c of the housing 7. Next, the bearing sleeve 8 is press-fitted in the inner periphery of the large diameter section 7a of the housing 7, and is further pressed until the end surface thereof in the direction of press-fitting of the bearing sleeve 8 (lower end surface) is abutted onto the stepped section 7d (engaged section). At this time, an adhesive is applied onto the inner peripheral surface of the large diameter section 7a of the housing and the outer peripheral surface of the bearing sleeve 8, if necessary, to perform the press-fitting operation, so that the housing 7 and the bearing sleeve 8 can be strongly fixed. As enlarged in FIG. 3, after the press-fitting of the bearing sleeve 8, a gap P extending in the axial direction is formed between the inner periphery at the angular portions of the large diameter section 7a of the housing and the outer peripheral surface of the bearing sleeve 8. Thereby, the bearing assembly shown in FIG. 2 can be obtained.

From the state shown in FIG. 2, the shaft member 2 is inserted in the inner periphery of the bearing sleeve 8 to fill the lubricating oil in the annular gap between the inner peripheral surface 8a of the bearing sleeve 8 and the outer peripheral surface of the shaft member 2, thereby completing the fluid bearing device 1 shown in FIG. 1. An air which is pressed onto the bottom section 7c of the housing 7 with the insertion of the shaft member 2 passes through the gap P between the inner peripheral surface of the large diameter section 7a of the housing and the outer peripheral surface of the bearing sleeve 8, and is released to the outside of the housing 7.

In the fluid bearing device 1 having the above configuration, when the shaft member 2 is rotated, an oil film whose pressure is increased by the dynamic pressure action of the dynamic pressure generating grooves 8a1 is formed in the radial bearing gap between the radial dynamic pressure generating regions N1 and N2 in the inner peripheral surface of the bearing sleeve 8 and the outer peripheral surface of the shaft member 2. By the oil film, radial bearing sections R1 and R2 which are in non-contact with and support the shaft member 2 in the radial direction are formed in two positions in the axial direction. The downward thrust load which is loaded onto the shaft member 2 is contactly supported in the thrust bearing section S.

According to the present invention, in the assembling process of the bearing device, the bearing sleeve 8 is press-fitted in the inner periphery of the housing 7, and is further pressed until the end surface of the bearing sleeve 8 engages with the stepped section 7d of the housing 7. Therefore, the relative position in the axial direction of the housing 7 and the bearing sleeve 8 can be determined. In addition, the pivot bearing is adopted as the thrust bearing section S, so that the gap setting operation of the thrust bearing gap is unnecessary. Therefore, the basic configuration of the bearing device can be completed simply by inserting the shaft member 2 in the inner periphery of the press-fitted bearing sleeve 8. Further, the pressed housing 7 has low rigidity, so that the press-fitting operation can be smoothly performed even when the housing 7 and the bearing sleeve 8 are slightly misaligned. Therefore, the alignment of the housing 7 and the bearing sleeve 8 at the time of press-fitting can be rough. According to the present invention, the configuration and the assembling process of the fluid bearing device can be simplified.

Also, the pressing cost of the housing 7 formed by pressing is significantly lower than that of the machined housing. Therefore, the configuration and the assembling process of the fluid bearing device can be simplified, and the component cost can be reduced, so that the cost of the entire bearing device can be reduced.

Figure 13:
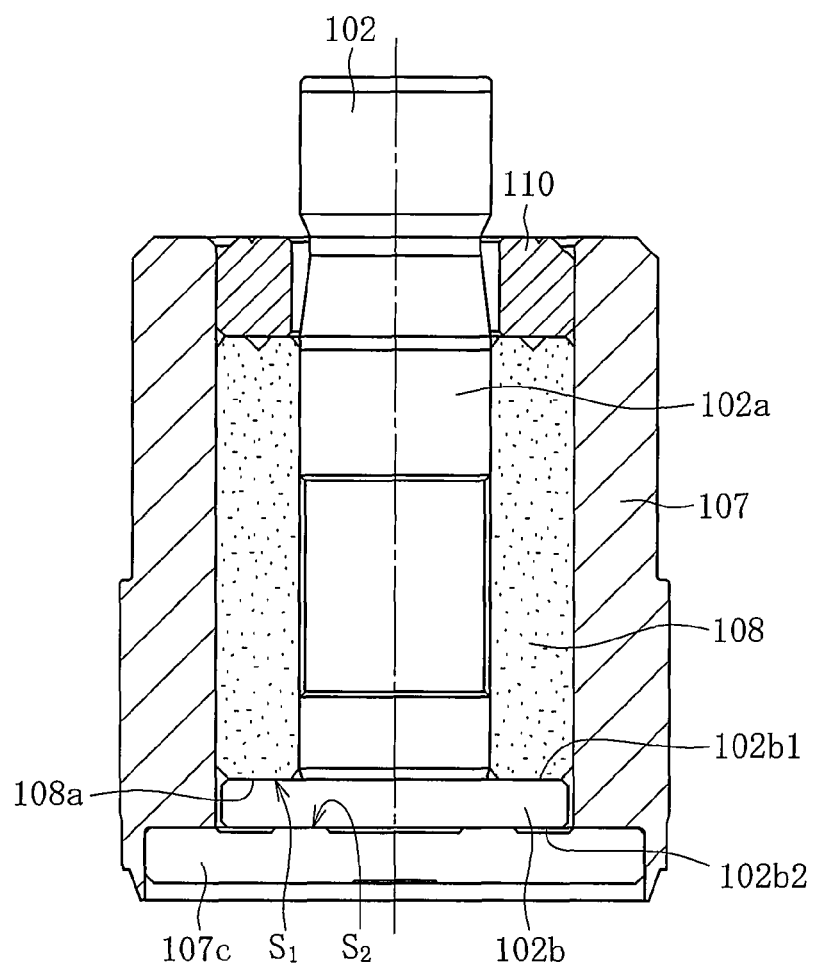
FIG. 13 is a cross-sectional view of a conventional fluid dynamic bearing device.

Also, according to the present invention, the flanged section at one end of the shaft member 2 which is essential in the bearing device shown in FIG. 13 is unnecessary. Therefore, the bearing device can be assembled even when the rotor 3 is attached to the upper end of the shaft member 2. In the fluid dynamic bearing device shown in FIG. 13, the different flanged member (hub) is required to be attached to the upper end of the shaft member after the entire bearing device is assembled, with the result that the press-fit load at the time of attaching is loaded onto the thrust bearing surface of the thrust bearing section S2 on the lower side, so that the thrust bearing surface can be deformed. On the contrary, in the present invention, the shaft member 2 can be assembled into the bearing device even after the rotor 3 is press-fitted in and fixed to the upper end thereof, so that such a disadvantage can be avoided.

Further, according to the present invention, the housing is made by pressing to lower the rigidity thereof, so that the pressed housing can have a smaller pressing force in the inner diameter direction that the bearing sleeve 8 press-fitted in the housing 7 receives, than the machined housing. Therefore, the deformation of the inner peripheral surface of the bearing sleeve with press-fitting can be prevented, so that the accuracy lowering of the radial dynamic pressure generating regions N1 and N2 due to press-fitting can be avoided. Also, even when the accuracy of the inner peripheral surface of the housing 7 is low, the influence on the radial dynamic pressure generating regions N1 and N2 is minimum, so that the pressed housing which is hard to be accurate can be used as-is without being post-processed. Also, the pivot bearing is used as the thrust bearing section S, so that the start torque at the time of re-start can be smaller after the motor is stopped.

Figure 12:
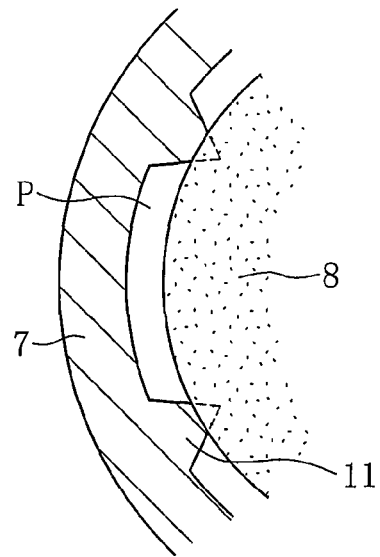
FIG. 12 is a diagram showing a further example of the shape of the housing and is a transverse sectional view of the fluid dynamic bearing device.

In particular, in the present invention, the large diameter section 7a of the housing 7 has a polygonal shape, so that the press-fitted portions between the outer periphery of the bearing sleeve 8 and the inner periphery of the housing 8 are provided at intervals in the peripheral direction. Therefore, the pressing force in the inner diameter direction which acts on the bearing sleeve 8 press-fitted in the inner periphery of the housing 7 can be smaller, so that the deformation of the inner peripheral surface of the bearing sleeve 8 can be further prevented. As shown in FIG. 12, such an effect can also be obtained by providing a plurality of projections 11 in the peripheral direction in the portions of the inner peripheral surface of the large diameter section 7a of the housing 7 opposite the outer peripheral surface of the bearing sleeve 8 and by resiliently deforming the projections 11 to press-fit the bearing sleeve 8 in the large diameter section 7a of the housing.

Figure 6:
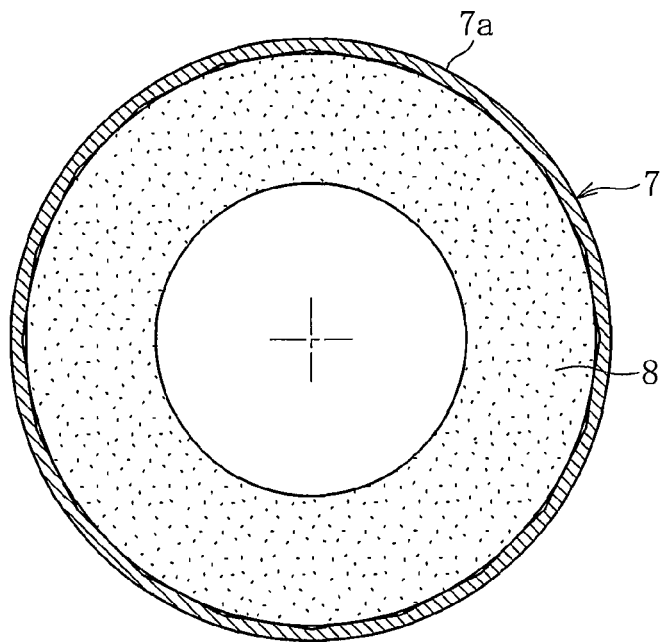
FIG. 6 is a diagram showing another example of the shape of a housing, is a transverse sectional view of the fluid dynamic bearing device, and is a partially enlarged view thereof.

In FIG. 3, both the inner peripheral surface and the outer peripheral surface of the large diameter section 7a of the housing have a polygonal cross section, and the wall thickness thereof in the peripheral direction is uniform. On the contrary, as shown in FIG. 6, the polygonal portions may be formed in such a manner that the inner peripheral surface of the large diameter section 7a of the housing has a polygonal cross section and the outer peripheral surface thereof is formed to have a circular cross section. With this configuration, the entire outer peripheral surface of the housing 7 has a circular shape, so that when the housing 7 is fitted and fixed into the inner periphery of the cylindrical bracket of the motor, the attaching accuracy can be improved to increase the rotation accuracy of the motor.

In the configuration in FIG. 1, unlike the conventional configuration shown in FIG. 13, the opening of the housing 7 is not sealed by a seal member (the reference numeral 110 in FIG. 13), and the end surface of the bearing sleeve 8 is exposed from the opening of the housing 7. In addition, the entire inner space of the housing 7 is not filled with the lubricating oil, and only the annular gap between the inner peripheral surface 8a of the bearing sleeve 8 and the outer peripheral surface of the shaft member 2 is filled with the lubricating oil. Therefore, the controlling process of the seal member and the oil surface position can be omitted, so that the cost can be further reduced. In this case, as indicated by the dashed lines in FIG. 1, to prevent oil leaking to the outside of the housing 7, an oil repellent film 12 is desirably formed on the outer peripheral surface of the shaft member 2 outside the bearing sleeve 8. The position in the axial direction of the oil repellent film 12 is, e.g., near the opening end of the housing 7.

Figure 4A:
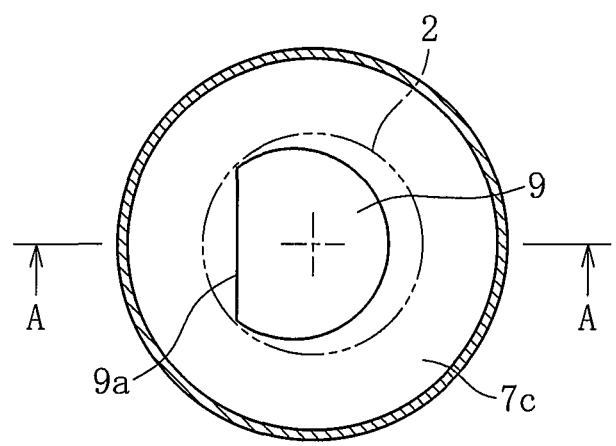
FIG. 4a is a diagram showing an embodiment in which a whirl stop is provided on a thrust receiver and is a transverse sectional view of the fluid dynamic bearing device.
Figure 4B:
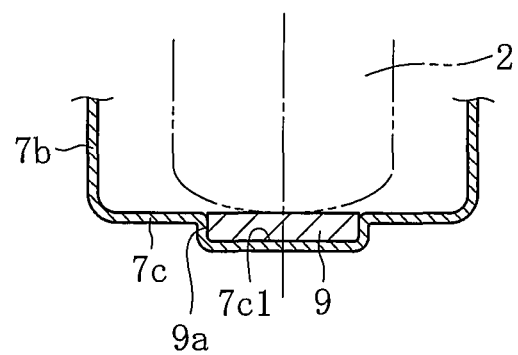
Figure 5A:
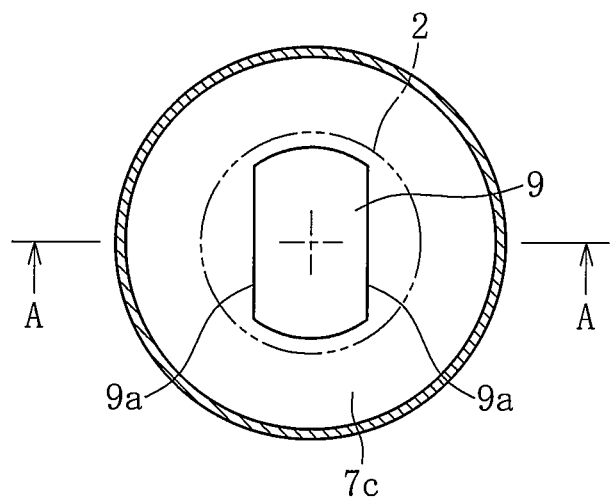
FIG. 5a is a diagram showing an embodiment in which the whirl stop is provided on the thrust receiver and is a transverse sectional view of the fluid dynamic bearing device.
Figure 5B:
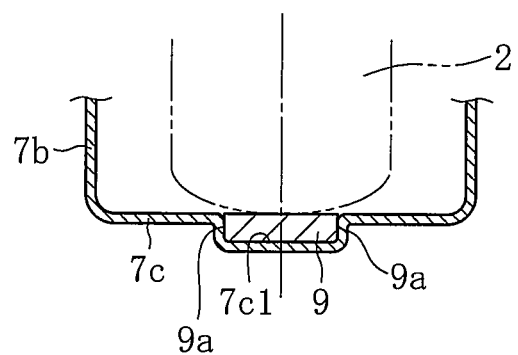

A whirl stop is desirably provided on the thrust receiver 9. FIGS. 4a, 4b, 5a, and 5b show examples of the whirl stop. Part of the disk-shaped thrust receiver 9 is cut away to form a flat surface 9a, and at the time of pressing the housing 7, a concave section 7c1 suitable for the shape of the thrust receiver 9 is provided in the bottom section 7c of the small diameter section 7b to accommodate the thrust receiver 9 therein. With such a configuration, the flat surface 9a of the thrust receiver 9 engages with the linear peripheral surface of the concave section 7c1 in the peripheral direction to perform the whirl stop of the thrust receiver. FIGS. 4a and 4b are an example in which one flat surface 9a is provided, and FIGS. 5a and 5b are an example in which two flat surfaces 9a are provided so as to be opposite.

Figure 7:
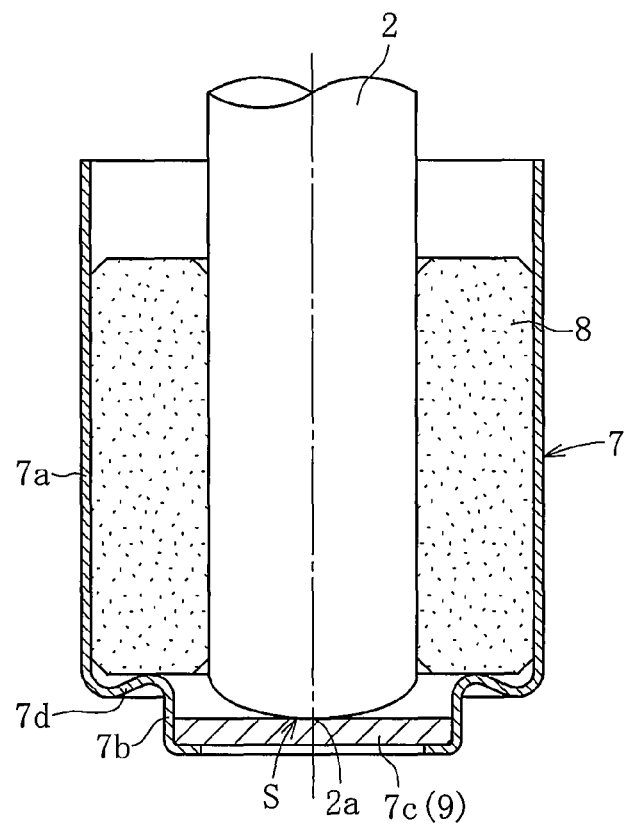
FIG. 7 is a diagram showing another embodiment of the fluid bearing device and is a cross-sectional view showing an embodiment in which a bottom section is separated from a small diameter section of the housing.

In FIG. 1, the bottom section 7c of the housing is integral with the small diameter section 7b, but as shown in FIG. 7, both can also be separated. In this case, the bottom section 7c functions as the thrust receiver 9. The bottom section 7c is fixed to the housing 7 by, e.g., caulking the lower end of the small diameter section 7b. The bottom section 7c itself may be formed of a material which has low friction and is excellent in wear resistance (e.g., resin). The bottom section 7c may be made of metal to form a film (e.g., a resin film and a hard film) which has low friction and is excellent in wear resistance in the slid portion of the surface thereof on the shaft member 2.

Figure 8:
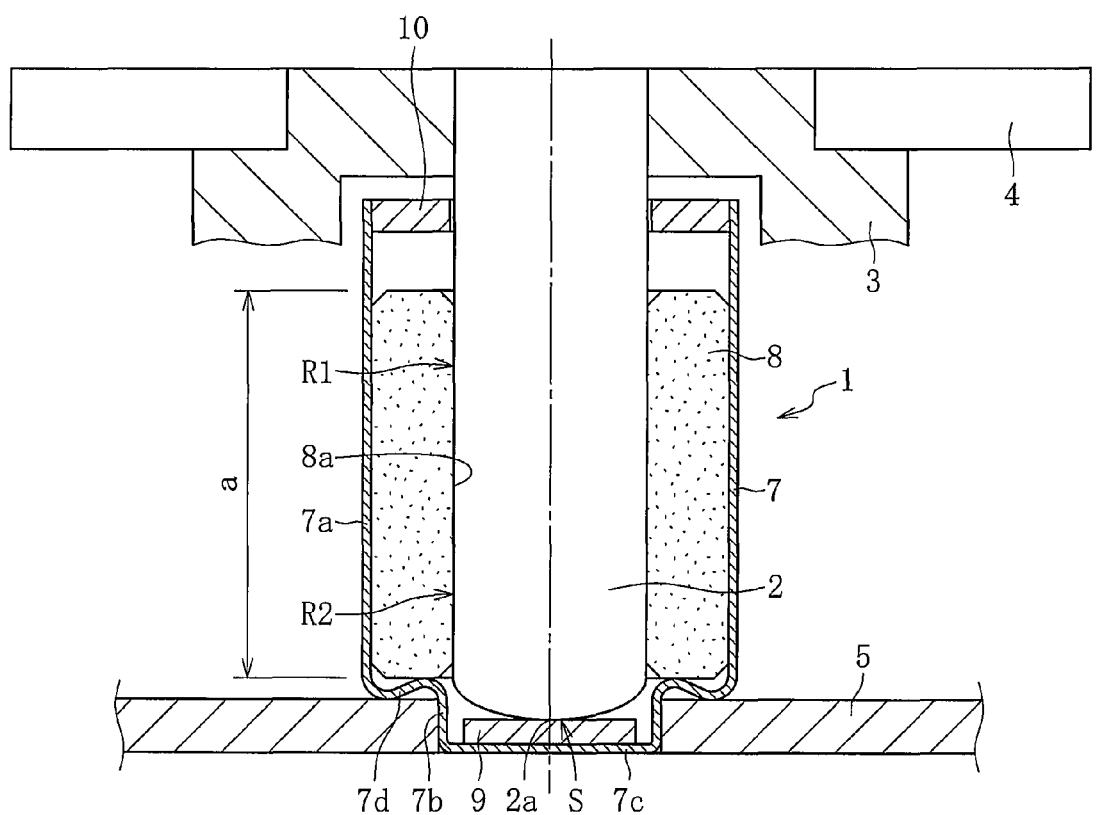
FIG. 8 is a diagram showing a further embodiment of the fluid bearing device and is a cross-sectional view showing an embodiment in which the opening of the housing is sealed by a seal section.
Figure 9:
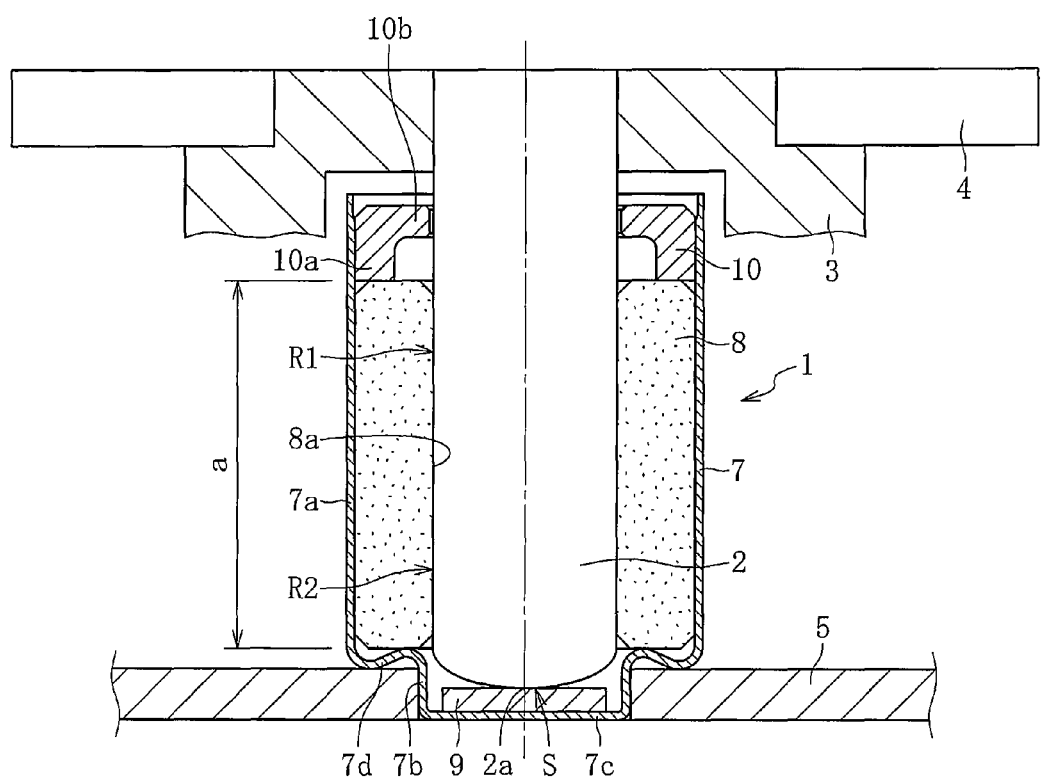
FIG. 9 is a diagram showing a furthermore embodiment of the fluid bearing device and is a cross-sectional view showing an embodiment in which the opening of the housing is sealed by the seal section.

In the embodiment shown in FIG. 1, the seal member is omitted, but as shown in FIG. 8, the opening of the housing 7 may be sealed by a seal member 10. The seal member 10 is annularly formed of, e.g., a soft metal material such as brass and other metal materials or a resin material, and is fixed to the upper end of the large diameter section 7a of the housing 7 in the state that the end surface thereof is spaced from the upper end surface of the bearing sleeve 8. The inner peripheral surface of the seal member 10 configures a non-contact seal (labyrinth seal) so as to be close to the outer peripheral surface of the shaft member 2. Any shape and configuration of the seal member 10 can be used, and for instance, as shown in FIG. 9, the seal member 10 can also be formed to have an L-shaped cross section, and integrally has a tubular leg section 10a which is abutted onto the end surface of the bearing sleeve 8, and a projected section 10b which is projected from the upper end of the leg section 10a to the inner diameter thereof.

In the configuration using the seal member 10, the lubricating oil is interposed only in the annular gap between the inner peripheral surface 8a of the bearing sleeve 8 and the outer peripheral surface of the shaft member 2, and a so-called full oil impregnation in which the entire inner space of the housing 7 including the space around the thrust bearing section S and the gap P in addition to the annular gap is filled with the lubricating oil can also be adopted. In the full oil impregnation configuration, the oil surface is typically present on the inner peripheral surface of the seal member 10.

The pressed housing 7 is desirably annealed as a thermal treatment. Specifically, the housing 7 is heated to 1050° C., which is held for a fixed time (about 20 minutes), and is then gradually cooled. Thereby, the pressing force in the inner diameter direction from the housing 7 in which the bearing sleeve 8 is press-fitted can be reduced, so that the deformation of the inner peripheral surface of the bearing sleeve 8 can be further prevented.

Figure 10:
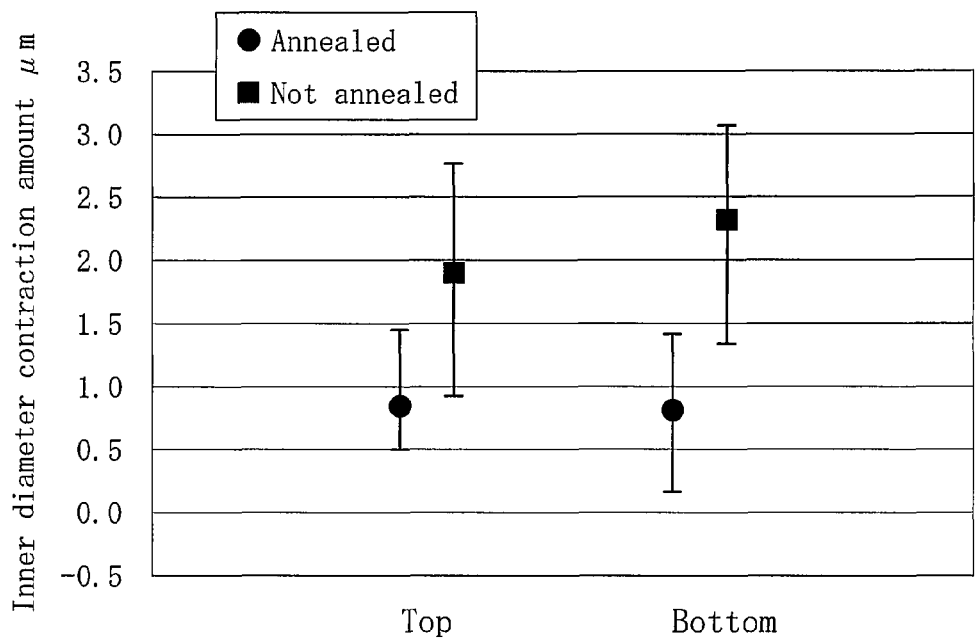
FIG. 10 is a chart showing the measured results of the deformation amount in the inner peripheral surface of a bearing sleeve according to whether annealing is performed or not.
Figure 11:
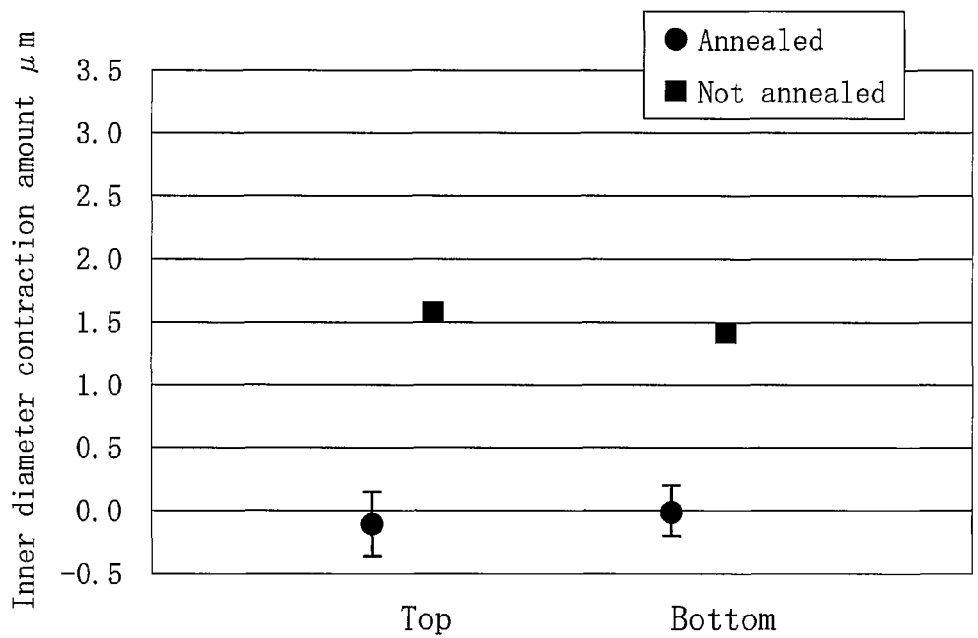
FIG. 11 is a chart showing the measured results of the deformation amount in the inner peripheral surface of the bearing sleeve according to whether annealing is performed or not.

FIG. 10 shows the measured results of the contraction amount in the inner peripheral surface of the bearing sleeve 8 according to whether the housing 7 is annealed or not. The bearing sleeve 8 has a dimension of $\phi 4$ mm (inner diameter)$\times \phi 7.5$ mm (outer diameter)$\times 7.3$ mm (length). The housing 7 is made of SUS305, and has a wall thickness of 0.2 mm. The press-fit allowance (the difference between the diameter of an inscribed circle of the housing 7 and the outer diameter of the bearing sleeve 8) is 12 µm. FIG. 10 shows the measured results in which the inner peripheral surface of the housing has an icosagonal shape and the outer peripheral surface of the housing has a circular shape (FIG. 6), and FIG. 11 shows the measured results in which both the inner and outer peripheral surfaces of the housing have an icosagonal shape (FIG. 3). In both drawings, the "Top" indicates the deformation amount in the radial dynamic pressure generating region N1 on the upper side, and the "Bottom" indicates the deformation amount in the radial dynamic pressure generating region N2 on the lower side. In the measured results of FIG. 11 in which both the inner and outer peripheral surfaces of the housing have an icosagonal shape, the plot point of "Not annealed" indicates an average value.

As is apparent from both drawings, the inner diameter contraction amount in the radial dynamic pressure generating regions N1 and N2 in "Annealed" is smaller than in "Not annealed". Therefore, it can be understood that the annealed housing can prevent the deformation of the radial dynamic pressure generating regions N1 and N2 more reliably to obtain a higher bearing performance.

The radial dynamic pressure generating regions N1 and N2 can be formed, not only in the inner peripheral surface of the bearing sleeve 8, but also in the outer peripheral surface of the shaft member 2. In addition, the radial dynamic pressure generating regions N1 and N2 can have a known shape such as a spiral shape, in addition to the herringbone shape. Further, in the embodiment, the shaft member 2 is rotated, but, likewise, the configuration of the present invention is applicable when the shaft member 2 is a fixed shaft and the housing 7 and the bearing sleeve 8 are rotated.

DESCRIPTION OF REFERENCE SIGNS

1: Fluid bearing device
2: Shaft member
3: Rotor
4: Polygon mirror
5: Circuit board
7: Housing
7a: Large diameter section
7b: Small diameter section
7c: Bottom section
7d: Stepped section
8: Bearing sleeve
8a1: Dynamic pressure generating groove (Dynamic pressure generating section)
9: Thrust receiver 10: Seal member
N1: Radial dynamic pressure generating region (upper side)
N2: Radial dynamic pressure generating region (lower side)
P: Gap
S: Thrust bearing section

The invention claimed is:

1. A fluid dynamic bearing device comprising:
a bearing sleeve;
a shaft member which is inserted in an inner periphery of the bearing sleeve;
a dynamic pressure generating section which is formed in any one of an outer peripheral surface of the shaft member and an inner peripheral surface of the bearing sleeve and generates fluid dynamic pressure in a radial bearing gap between the outer peripheral surface of the shaft member and the inner peripheral surface of the bearing sleeve;
a housing having an engaged section which engages with an end surface of the bearing sleeve and which is located ahead in a direction of press-fitting of the bearing sleeve, the housing comprising a large diameter section, a small diameter section, and a stepped section which connects the large diameter section and the small diameter section;
a thrust receiver which is in contact with and supports an end of the shaft member; and
a base fixed onto an outer peripheral surface of the small diameter section,
wherein a bottom section is integral with or is separated from the housing, the thrust receiver being disposed on the bottom section,
wherein the bearing sleeve is press-fitted in an inner periphery of the large-diameter section of the housing, and
wherein press-fitted portions between an outer periphery of the bearing sleeve and an inner periphery of the housing are provided at intervals, in the peripheral direction.

2. The fluid dynamic bearing device according to claim 1, wherein the stepped section forms the engaged section.

3. The fluid dynamic bearing device according to claim 1 or 2, wherein the bottom thrust receiver is separate from the bottom section.

4. The fluid dynamic bearing device according to claim 3, wherein a whirl stop for the thrust receiver is provided on the bottom section of the housing.

5. The fluid dynamic bearing device according to claim 1, wherein the thrust receiver is integral with the bottom section.

6. The fluid dynamic bearing device according to claim 1, wherein portions of an inner peripheral surface of the housing which are at least opposite an outer peripheral surface of the bearing sleeve have a polygonal cross section.

7. The fluid dynamic bearing device according to claim 6, wherein portions of the housing which are at least opposite the outer peripheral surface of the bearing sleeve have a uniform wall thickness.

8. The fluid dynamic bearing device according to claim 1, wherein an outer peripheral surface of the large diameter section has a circular cross section.

9. The fluid dynamic bearing device according to claim 1, wherein a plurality of projections are provided in the peripheral direction in portions of an inner peripheral surface of the housing which are at least opposite outer peripheral surface of the bearing sleeve.

10. The fluid dynamic bearing device according to claim 1, wherein the pressed housing is annealed.

11. The fluid dynamic bearing device according to claim 1, wherein the base annularly makes a line contact with the stepped portion.

12. A fluid dynamic bearing device comprising:
a bearing sleeve;
a shaft member which is inserted in an inner periphery of the bearing sleeve;
a dynamic pressure generating section which is formed in any one of an outer peripheral surface of the shaft member and an inner peripheral surface of the bearing sleeve and generates fluid dynamic pressure in a radial bearing gap between the outer peripheral surface of the shaft member and the inner peripheral surface of the bearing sleeve;
a housing having an engaged section which engages with an end surface of the bearing sleeve and which is located ahead in a direction of press-fitting of the bearing sleeve, the housing comprising a large diameter section, a small diameter section, and a stepped section which connects the large diameter section and the small diameter section; and
a base fixed onto an outer peripheral surface of the small diameter section,
wherein a bottom section is integral with or is separated from the housing,
wherein the bearing sleeve is press-fitted in an inner periphery of the large-diameter section of the housing,
wherein press-fitted portions between an outer periphery of the bearing sleeve and an inner periphery of the housing are provided at intervals, in the peripheral direction, and
wherein a portion of the bottom section which contacts the shaft member is subjected to a surface treatment for improving a friction property and wear resistance.

* * * * *